(12) United States Patent
Garvey et al.

(10) Patent No.: US 10,081,072 B2
(45) Date of Patent: Sep. 25, 2018

(54) WELDING TORCH WITH WIRE FEED SPEED CONTROL

(75) Inventors: Paul William Garvey, Kaukauna, WI (US); Chris J. Roehl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1653 days.

(21) Appl. No.: 13/430,403

(22) Filed: Mar. 26, 2012

(65) Prior Publication Data

US 2012/0248083 A1    Oct. 4, 2012

Related U.S. Application Data

(60) Provisional application No. 61/468,848, filed on Mar. 29, 2011.

(51) Int. Cl.
*B23K 9/12* (2006.01)
*B23K 9/133* (2006.01)

(52) U.S. Cl.
CPC ............ *B23K 9/133* (2013.01); *B23K 9/1336* (2013.01)

(58) Field of Classification Search
CPC .... B23K 9/133; B23K 9/1333; B23K 9/1336; B23K 9/125; B23K 9/124; B23K 9/123; B23K 9/122; B23K 9/121
USPC ... 219/137.7, 137.2, 137.31, 137.44, 137.51, 219/137.61, 137.8; 99/295, 323, 323.3; 210/282, 314; 426/431, 77
See application file for complete search history.

(56) References Cited

U.S. PATENT DOCUMENTS

| | | | |
|---|---|---|---|
| 1,873,326 | A | 8/1932 | Ratigan |
| 2,719,245 | A | 9/1955 | Anderson |
| 3,016,451 | A | 1/1962 | Cornell |
| 3,055,591 | A | 9/1962 | Shepard |
| 3,734,369 | A | 5/1973 | Johnson |

(Continued)

FOREIGN PATENT DOCUMENTS

| | | |
|---|---|---|
| DE | 20113852 | 11/2001 |
| EP | 1577245 A2 | 9/2005 |

(Continued)

OTHER PUBLICATIONS

International Search Report from PCT application No. PCT/US2014/017224, dated Aug. 12, 2014, 8 pgs.

(Continued)

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

A welding torch has a torch handle. A wire drive assembly is disposed in the torch handle and includes a drive motor and a drive roller. The wire drive assembly contacts the welding wire and is configured to drive the welding wire from a wire feeder to a welding operation. In addition, the welding torch has a trigger and a wire feed speed adjustment assembly. The trigger is disposed near a rear end of the torch handle and is configured to be depressed by an operator for initiating feed of the welding wire. The adjustment assembly is positioned near the rear end of the handle adjacent to the trigger and on the same side of the handle as the trigger. The adjustment assembly allows operator adjustment of a feed speed of the welding wire.

18 Claims, 6 Drawing Sheets

(56) References Cited

U.S. PATENT DOCUMENTS

| | | |
|---|---|---|
| 4,527,037 A | 7/1985 | Johnson |
| 4,703,156 A | 10/1987 | Hayes |
| 4,954,690 A | 9/1990 | Kensrue |
| 5,410,126 A | 4/1995 | Miller |
| 5,816,466 A | 10/1998 | Seufer |
| 6,286,748 B1 | 9/2001 | Cooper |
| 6,388,234 B1 | 5/2002 | Collins |
| 6,427,894 B1 | 8/2002 | Blank |
| 6,536,644 B2 | 3/2003 | Plow |
| 6,557,742 B1 | 5/2003 | Bobeczko |
| 6,568,578 B1 | 5/2003 | Kensrue |
| 7,244,909 B2 | 7/2007 | Kensrue et al. |
| 7,301,124 B2 | 11/2007 | Kaufman |
| 7,374,074 B2 | 5/2008 | Matiash |
| 7,615,723 B2 | 11/2009 | Matiash |
| 7,767,934 B2 | 8/2010 | Christopher |
| 7,977,604 B2 | 7/2011 | Ertmer |
| 2002/0130153 A1 | 9/2002 | Plow |
| 2003/0015510 A1 | 1/2003 | Wakeman |
| 2005/0016976 A1 | 1/2005 | Belfiore |
| 2005/0040202 A1 | 2/2005 | Kerekes |
| 2005/0224486 A1 | 10/2005 | Matiash |
| 2006/0219683 A1* | 10/2006 | Kensrue et al. ......... 219/137.31 |
| 2006/0278623 A1* | 12/2006 | Christopher et al. ...... 219/137.7 |
| 2009/0277890 A1 | 11/2009 | Leiteritz |
| 2011/0220628 A1 | 9/2011 | Mehn |
| 2012/0152924 A1 | 6/2012 | Christopher |
| 2012/0152926 A1 | 6/2012 | Matiash |
| 2012/0248084 A1 | 10/2012 | Romenesko |
| 2013/0334190 A1 | 12/2013 | Garvey |
| 2015/0014383 A1 | 1/2015 | Patterson |

FOREIGN PATENT DOCUMENTS

| | | |
|---|---|---|
| EP | 2476500 | 7/2012 |
| GB | 1093736 | 12/1967 |
| WO | 0128728 | 4/2001 |
| WO | 03022501 A2 | 3/2003 |
| WO | 2008018960 | 2/2008 |
| WO | 2008018961 | 2/2008 |
| WO | 2013033849 | 3/2013 |

OTHER PUBLICATIONS

International Search Report from PCT application No. PCT/US2014/045166, dated Nov. 5, 2014, 10 pgs.

International Search Report from PCT application No. PCT/US2013/045280 dated Oct. 18, 2013, 9 pgs.

* cited by examiner

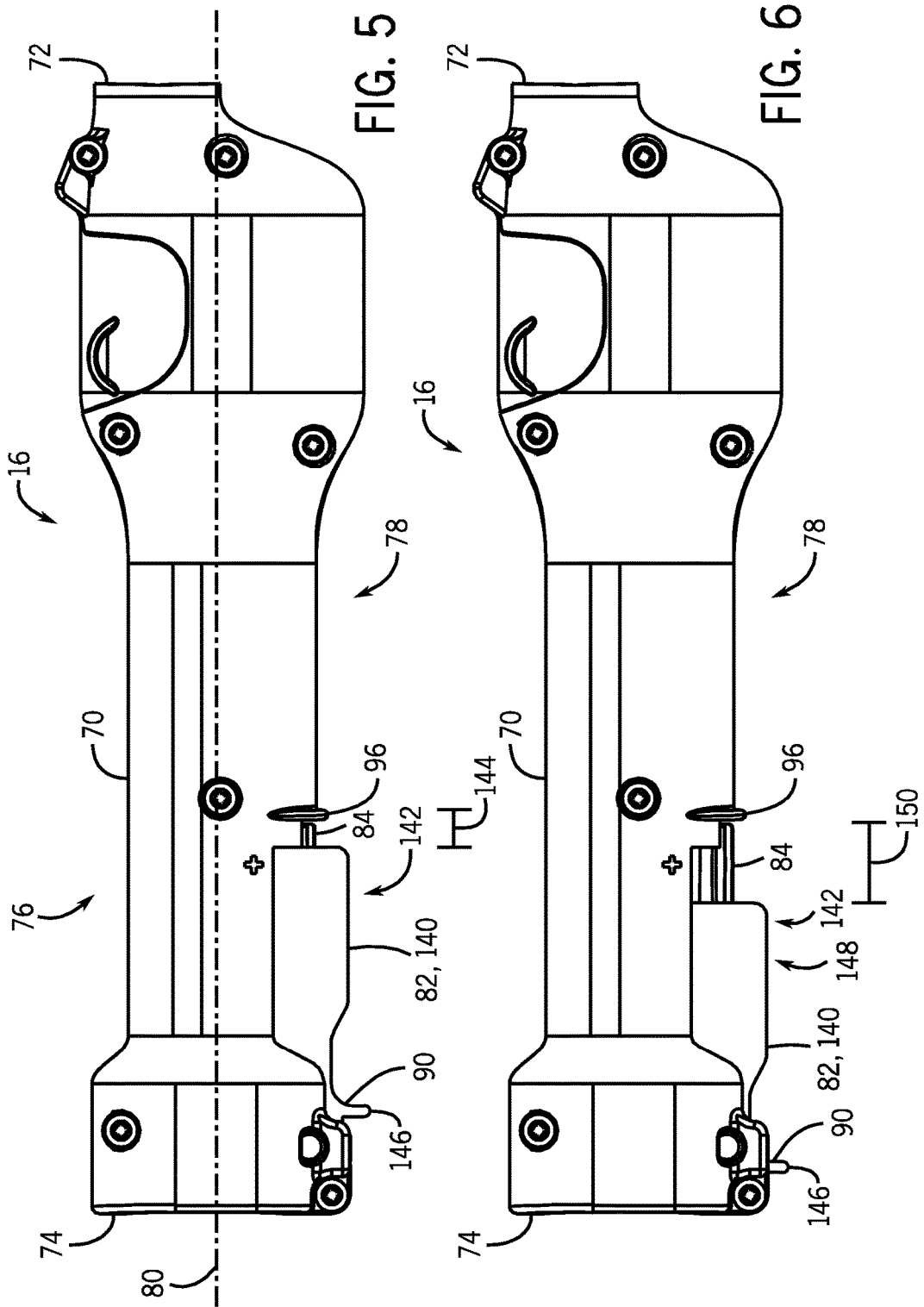

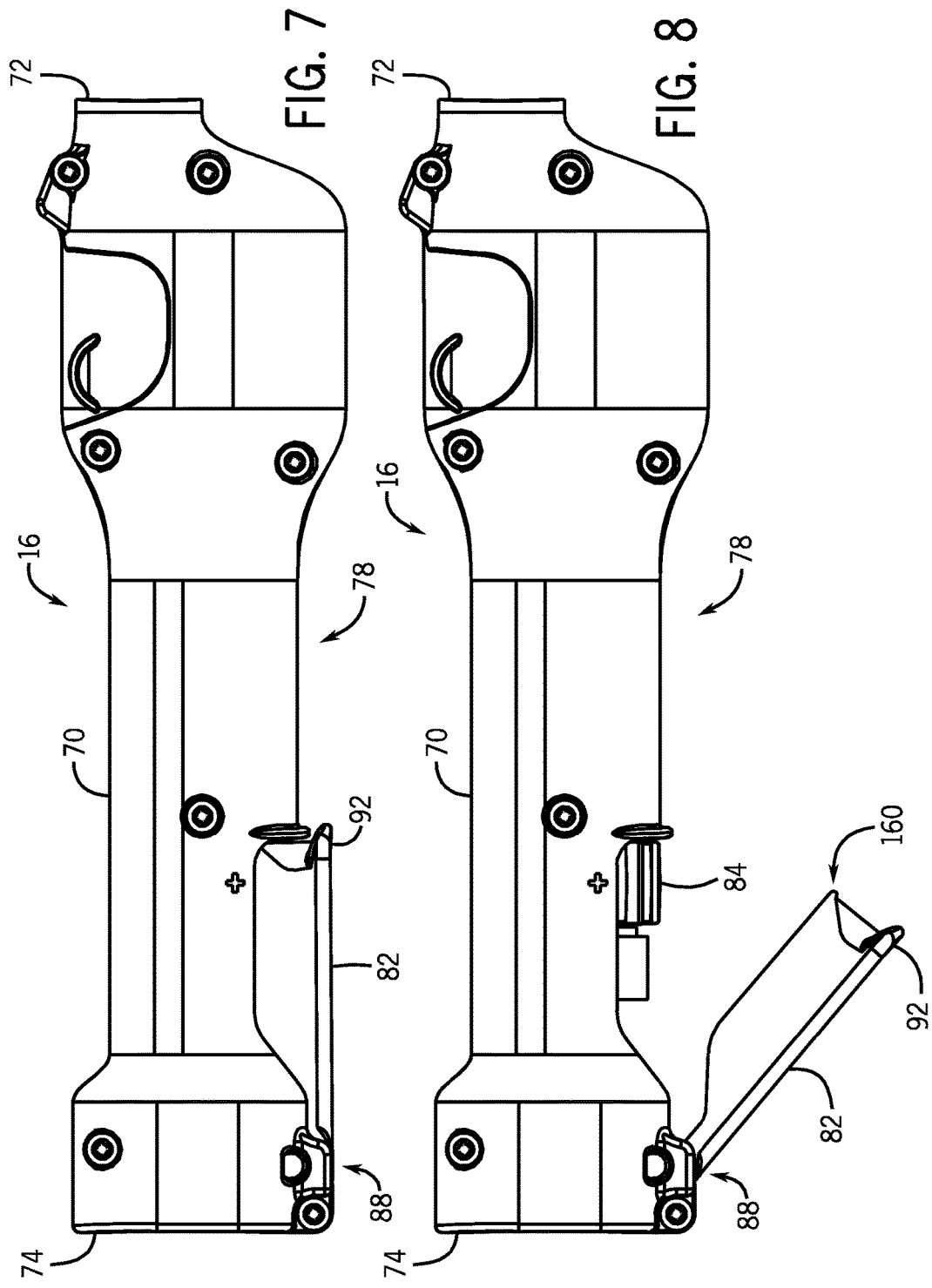

# WELDING TORCH WITH WIRE FEED SPEED CONTROL

CROSS REFERENCE TO RELATED APPLICATIONS

This application is a Non-Provisional Patent Application of U.S. Patent Application No. 61/468,848, entitled "Novel Placement and Protection of Wire Feed Speed Control Knob on MIG Gun" and filed Mar. 29, 2011, which is herein incorporated by reference in its entirety.

BACKGROUND

The invention relates generally to welding torches, and more specifically, to systems that allow for operator adjustment of wire feed speeds in the torch handle.

A wide range of welding systems and welding control regimes have been implemented for various purposes. For example, metal inert gas (MIG) techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld.

The welding torch may include features so that an operator may adjust various operating parameters of the welding system. For example, it may be desirable to adjust a wire feed speed at various times during the welding operation. In many applications, this requires that the welding operator interrupt his/her work and make an adjustment at the wire feeder, which may be at some distance from the workpiece. In other cases, an adjustment is provided on the torch handle, but this may be subject to inadvertent adjustment due to its placement. That is, the operator may mistakenly adjust the wire feed speed, or the welding torch may brush up against an obstacle, resulting in advertent adjustment of the wire feed speed. This inadvertent adjustment may result in a poor quality weld with associated rework, and additional time and effort for the operator to monitor and readjust the weld parameters to the desired value.

Such adjustability may be particularly useful in torches that draw wire by virtue of a motor included in the torch body. Such torches are commonly used in applications using aluminum and aluminum alloy wires that are both pushed by a motor in a wire feeder and pulled by a small motor in the torch. In such cases, the adjustment may affect the rate of rotation of the wire feeder motor, the torch motor, or both.

BRIEF DESCRIPTION

The present invention provides welding systems designed to permit adjustment of wire feed speed by an input device in a welding torch handle. A wire drive assembly is disposed in the torch handle and includes a drive motor and a drive roller. The wire drive assembly contacts a welding wire and is configured to drive the welding wire from a wire feeder to a welding operation. In addition, the welding torch handle has a trigger and a wire feed speed adjustment assembly. The trigger is disposed near a rear end of the torch handle and is configured to be depressed by an operator for initiating feed of the welding wire. The adjustment assembly is positioned near the rear end of the handle adjacent to the trigger and on the same side of the handle as the trigger. The adjustment assembly allows operator adjustment of a feed speed of the welding wire.

In another exemplary embodiment, a welding torch has a torch handle. A wire drive assembly is disposed in the torch handle and includes a drive motor and a drive roller. The wire drive assembly contacts a welding wire and is configured to drive the welding wire from a wire feeder to a welding operation. In addition, the welding torch handle has a trigger and a wire feed speed adjustment assembly. The trigger is configured to be depressed by an operator for initiating feed of the welding wire. The adjustment assembly is positioned adjacent to the trigger and on the same side of the handle as the trigger for allowing operator adjustment of a feed speed of the welding wire with a single hand.

In another exemplary embodiment, a welding torch has a torch handle. A wire drive assembly is disposed in the torch handle and includes a drive motor and a drive roller. The wire drive assembly contacts a welding wire and is configured to drive the welding wire from a wire feeder to a welding operation. In addition, the welding torch handle has a trigger and a wire feed speed adjustment assembly. The trigger is configured to depress a switch for initiating feed of the welding wire. The adjustment assembly is positioned adjacent to the trigger and includes a rotary potentiometer for adjusting a feed speed of the welding wire. The switch and the rotary potentiometer are part of a single subassembly disposed within the torch handle.

DRAWINGS

These and other features, aspects, and advantages of the present invention will become better understood when the following detailed description is read with reference to the accompanying drawings in which like characters represent like parts throughout the drawings, wherein:

FIG. 5 is a partial perspective view of the exemplary welding torch of FIG. 1 including a sliding trigger in a normal position;

FIG. 6 is a partial perspective view of the exemplary welding torch of FIG. 5 including the sliding trigger in an open position to enable operator adjustment of welding parameters;

FIG. 7 is a partial perspective view of the exemplary welding torch of FIG. 1 including a trigger with a snap feature in a closed position; and FIG. 8 is a partial perspective view of the exemplary welding torch of FIG. 7 including the trigger with the snap feature in an open position to enable operator adjustment of welding parameters.

DETAILED DESCRIPTION

Figure 1:
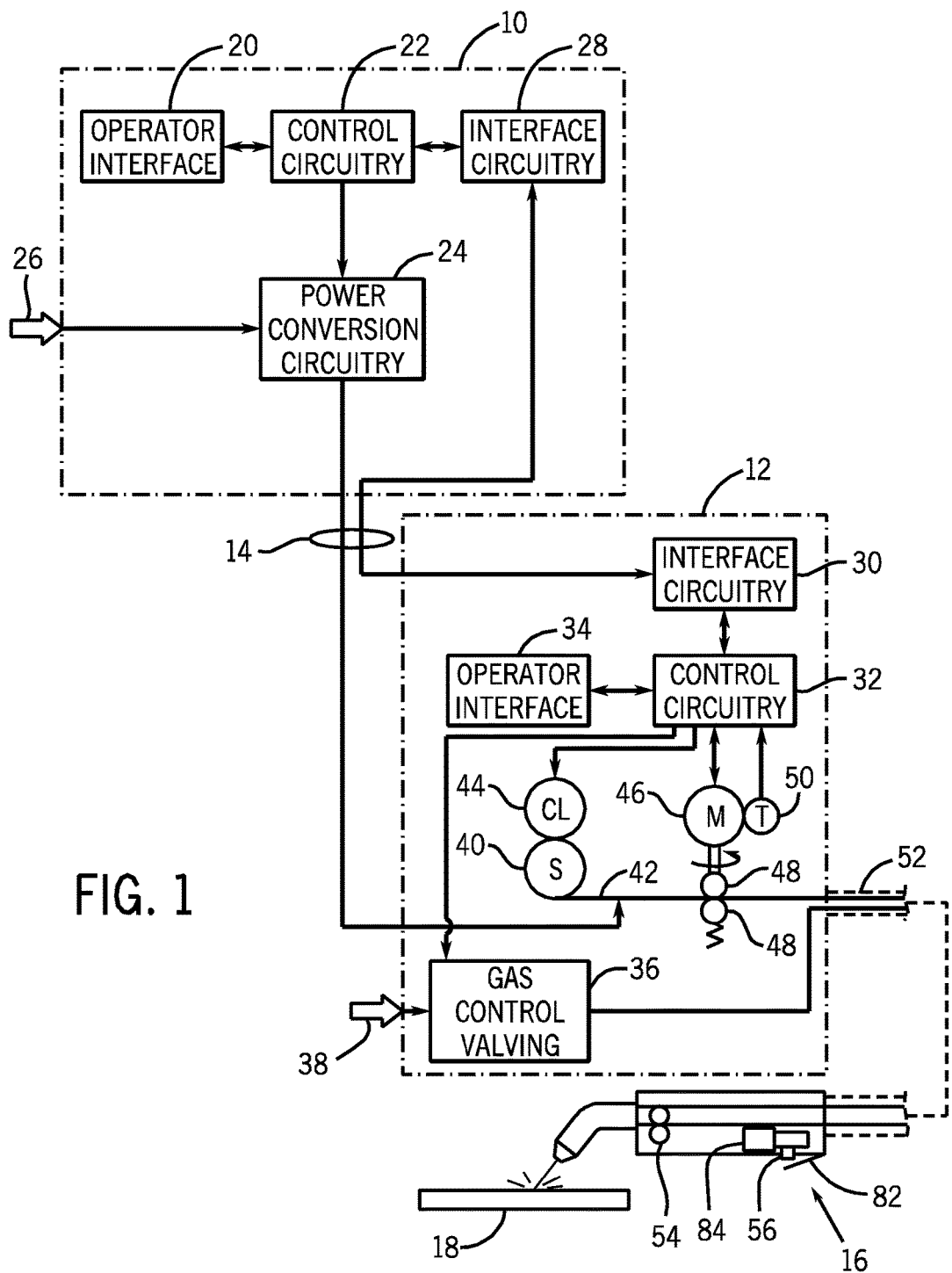
FIG. 1 is a diagrammatical representation of an exemplary MIG welding system illustrating a welding torch coupled to a wire feeder in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder 12, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices as described more fully below.

The system is designed to provide wire, power, and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor (not shown) is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with aluminum or other welding wire that is both pushed towards the torch and pulled through the torch. These weld settings are communicated to control circuitry 22 within the power supply. It should be noted that while reference is made in the present disclosure to "MIG" welding, the torch and techniques described may be used with or without inert gas, such as with flux cored or metal cored wires.

The control circuitry 22 operates to control generation of welding power output that is applied to the welding wire for carrying out the desired welding operation. Accordingly, the control circuitry is coupled to power conversion circuitry 24. This power conversion circuitry is adapted to create the output power that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. The wire feeder 12 also includes control circuitry 32 coupled to the interface circuitry 30. As described more fully below, the control circuitry 32 allows for wire feed speeds to be controlled in accordance with operator selections. The control circuitry also allows for calibration of feed rates for the wire as described below. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shield and gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 36. For example, one or more spools of welding wire 40 are housed in the wire feeder. Welding wire 42 is unspooled from the spools and is progressively fed to the torch as described below. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 is provided for detecting the speed of the motor 46, the rollers 48, or any other associated component so as to provide an indication of the actual wire feed speed. Signals from the tachometer are fed back to the control circuitry 36.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor is provided with associated drive rollers 54. The drive rollers 54 contact the welding wire and drives the welding wire from the wire feeder 30 to the welding operation, as described further below. A trigger switch 56 within the torch provides a signal that is fed back to the wire feeder and therefrom back to the power supply to enable the welding process to be started and stopped by the operator. That is, upon depression of the trigger switch, gas flow is begun, wire is advanced, and power is applied to the welding cable 52 and through the torch to the advancing welding wire, as described further below.

Figure 2:
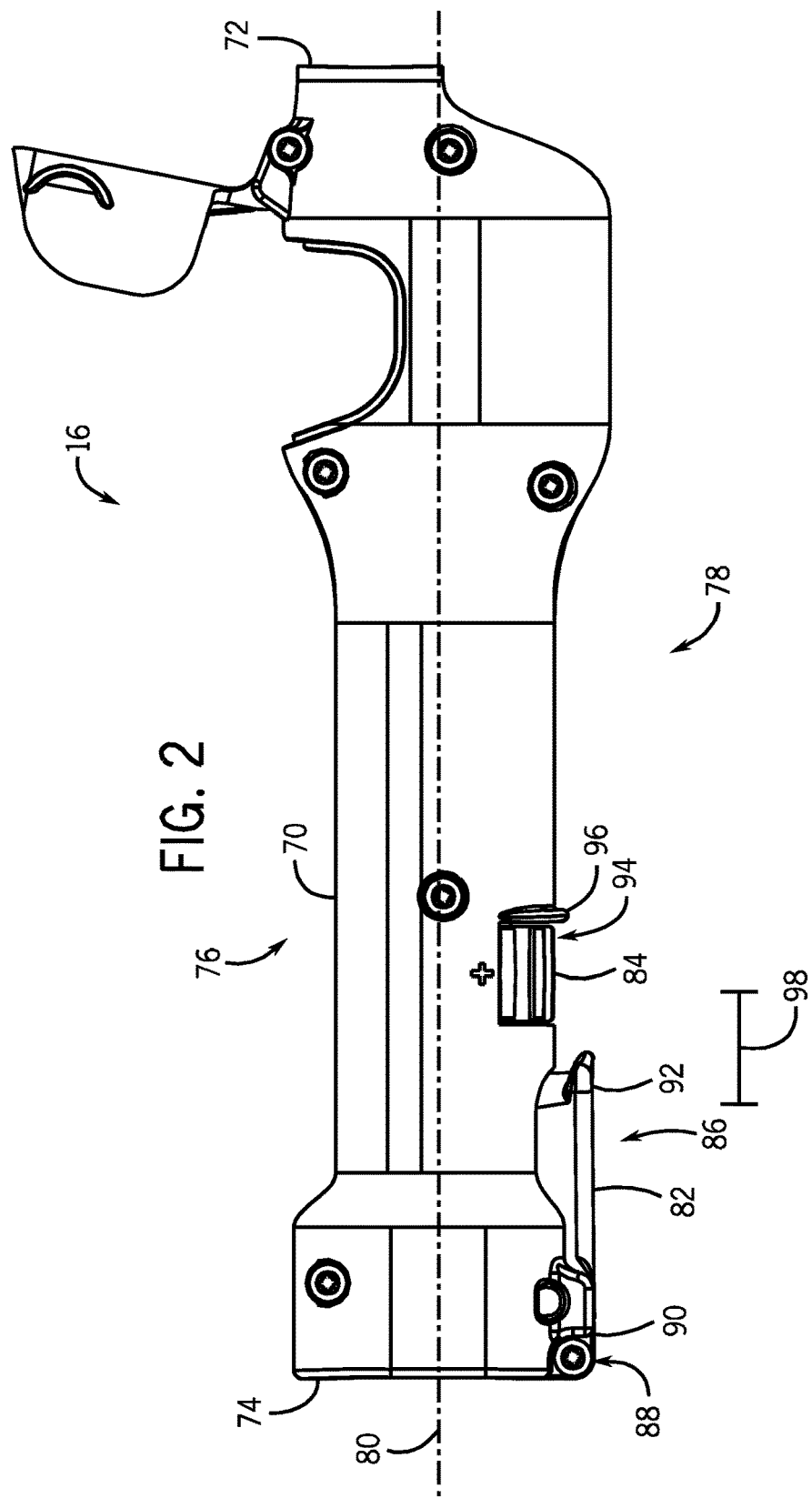
FIG. 2 is a partial perspective view of the exemplary welding torch of FIG. 1 including features to permit adjustment of wire feed speed in the torch.

FIG. 2 illustrates a partial perspective view of the welding torch 16 of FIG. 1 including features to allow adjustment of the wire feed speed, and to enable single-handed initiation and adjustment of the wire feed speed. The welding torch 16 has a torch handle 70, which may be held by an operator during a welding operation. The torch handle 70 extends from a front end 72 to a rear end 74. A welding head tube (e.g., gooseneck) may be disposed at the front end 72 to bend or shape the welding wire 42 as it exits the welding torch 16.

Without loss of generality, the torch handle 70 also has a top side 76 and a bottom side 78. The sides 76, 78 may generally refer to an orientation of the torch handle 70. As may be appreciated, the torch handle 70 may be rotated about a longitudinal axis 80, such that the orientation of the torch handle 70 may change. Thus, the terms "top" and "bottom" are not intended to impose a spatial limitation on the corresponding elements.

The welding torch 16 has a trigger 82 disposed near the rear end 74 of the torch handle 70. The trigger 82 is configured to be depressed by one or more fingers of the operator to initiate the welding operation. That is, upon depression of the trigger 82, the trigger switch 56 may be actuated, beginning gas flow (where gas is used), advancing welding wire, and supplying power to the welding system. For example, when the trigger 82 and subsequently the trigger switch 56 is depressed, the wire feeder 12 may begin to feed wire to the welding torch 16. The rate at which wire is fed to the welding torch 16 may be adjusted by a wire feed speed adjustment assembly, such as comprising an adjustment wheel 84. As noted previously, it may be desirable to adjust the wire feed speed at various times during a welding operation. Accordingly, the operator may adjust the wheel 84 to increase or decrease the wire feed speed, as desired. For example, a clockwise rotation may decrease the wire feed speed, and a counter-clockwise rotation may increase the wire feed speed. The wire feed speed settings may also be input via the operator input 34 on the wire feeder 12 or on the operator interface 20 of the power supply 10. In certain embodiments, the wire feed speed set by the adjustment wheel 84 may override the settings input via the operator input 34 or the operator interface 20.

In the embodiment shown, the trigger 82 has a generally rectangular cross section with a surface 86 that is generally parallel to the longitudinal axis 80. The trigger 82 is configured to pivot about a rear pivot axis 88, which is disposed at a rear end 90 of the trigger 82. For example, an operator may depress a front end 92 of the trigger 82, which may pivot the trigger 82 about the pivot axis 88, causing the surface 86 to become crosswise to the longitudinal axis 80. In certain embodiments, the action or shape of the trigger 82 may vary. For example, the pivot axis 88 may be disposed at the front end 92 of the trigger 82, or the cross section may be triangular, curved, or have another suitable shape. As may be appreciated, the shape and movement of the trigger 82 may be implementation-specific, and may vary among embodiments.

The adjustment wheel 84 has circumferentially spaced teeth 94 that may be grasped or caught by a finger of the operator (even when gloved) to turn the adjustment wheel 84. The adjustment wheel 84 may be coupled to a wire drive assembly, as described further below, to enable adjustment of the wire feed speed. As illustrated, the adjustment wheel 84 may be rotated about the longitudinal axis 80 to adjust the wire feed speed. The axis of rotation of the adjustment wheel 84 is transverse to the rear pivot axis 88 of the trigger 82 (e.g., parallel to the longitudinal axis 80 of the torch handle 70). In certain embodiments, the axis of rotation may instead be parallel or skew to the rear pivot axis 88, such that the adjustment wheel 84 rotates along the longitudinal axis 80. The torch handle 70 may include mechanical stops to limit the rotation of the adjustment wheel 84. Further, the control circuitry 22 may include software thresholds (e.g., maximums or minimums) to limit the wire feed speed based on the position of the adjustment wheel 84.

As may be appreciated, the welding operation may occur in a tight, confined area with little room for maneuverability. To avoid inadvertent adjustment of the wire feed speed, a guard 96 may be disposed forward (e.g., towards the front end 72) of the adjustment wheel 84. As illustrated, the guard 96 may protrude radially outwards from the torch handle 70 and extend radially past the adjustment wheel 84. Accordingly, the adjustment wheel 84 may be recessed within the torch handle 70 behind the guard 96. As shown, the guard 96 may fully conceal the adjustment wheel 84 along the longitudinal direction 80. However, in certain embodiments, the adjustment wheel 84 may be partially concealed by the guard 96, depending on space constraints on the handle 70 or other design considerations.

As illustrated, the trigger 82 and the adjustment wheel 84 are disposed on the same side (e.g., the bottom side 78) of the torch handle 70 to enable single-handed operation of the welding torch 16. Additionally, the trigger 82 and the adjustment wheel 84 are disposed near the same end (e.g., the rear end 74) of the torch handle 70. The trigger 82 and adjustment wheel 84 are laterally centered on the bottom side 78 and are adjacent to one another, such that the operator may simultaneously depress the trigger 82 and rotate the adjustment wheel 84 with a single hand. For example, the operator may depress the trigger 82 with a middle finger of a left and rotate the adjustment wheel 84 with an index finger of the left hand, while holding and positioning the welding torch 16 with a right hand. To this end, the adjustment wheel 84 may be mounted forward of the trigger 82. In certain embodiments, positioning of the wheel 84 may vary according to operator preference. That is, the trigger could be placed forward of the wire feed speed adjustment device. The positioning of the trigger 82 and adjustment wheel 84 may improve operability of the welding torch 16, while simultaneously reducing the likelihood of inadvertent rotation of the adjustment wheel 84, particularly when these are disposed near the rear of the torch handle.

Additionally, a distance 98 between the trigger 82 and the adjustment wheel 84 may be designed for optimal single-handed use of the welding torch 16. In certain embodiments, the distance 98 may be less than approximately 1, 2, 3, or 4 inches, and may be based at least partially on the size of the operator's hand. The placement of the trigger 82 and adjustment wheel 84 allow for single-handed use of the welding torch 16, while simultaneously reducing the likelihood of inadvertent adjustment of the wire feed speed. As described further below in FIG. 3, the trigger 82 and wheel 84 may be coupled to internal components of the welding torch 16 to initiate and adjust the wire feed speed to the welding operation.

Figure 3:
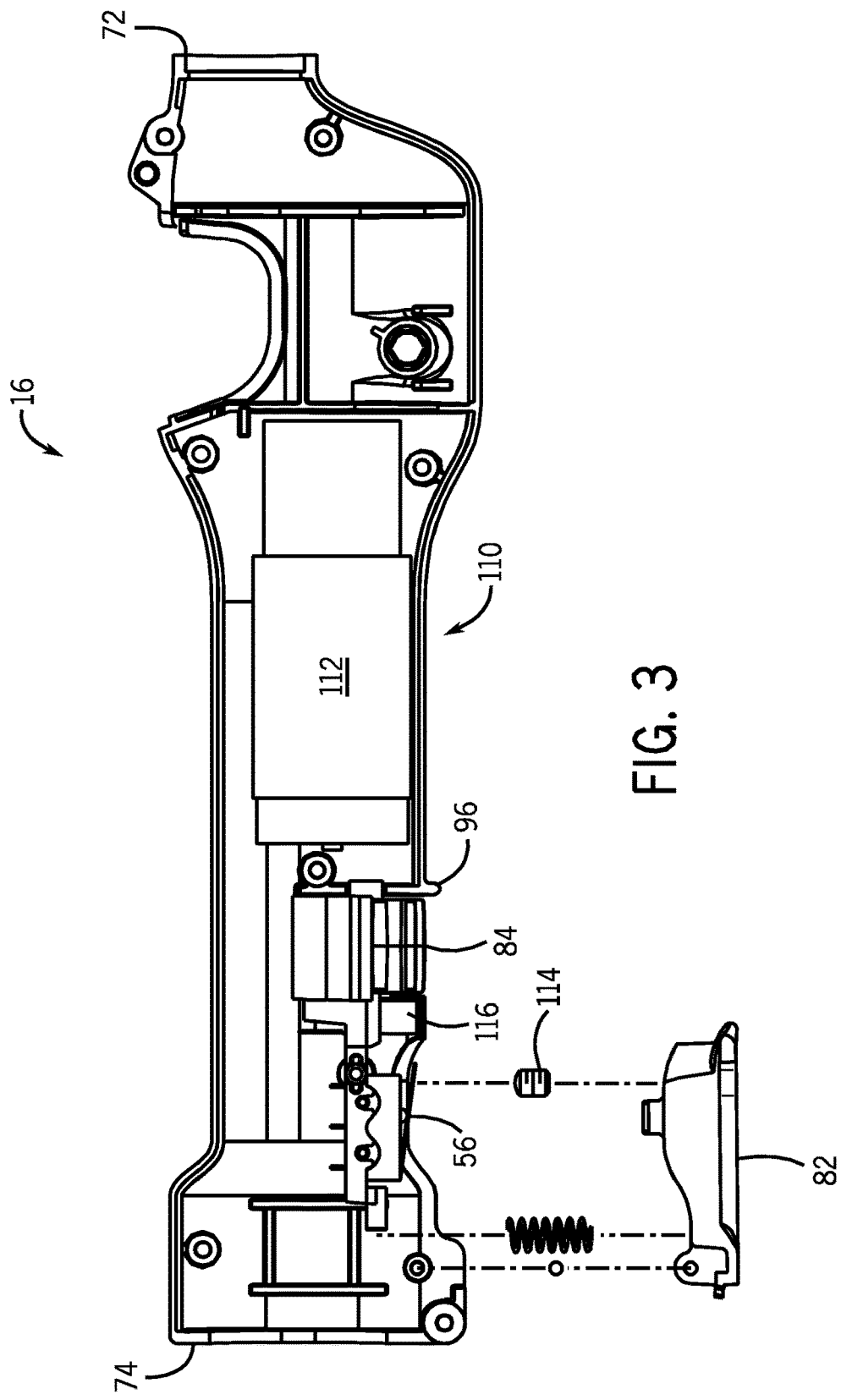
FIG. 3 is a partial cross-sectional view of the exemplary welding torch of FIG. 2 illustrating certain internal components of the welding torch.

FIG. 3 is a partial cross-sectional view of the welding torch 16 illustrating internal components of the torch 16 configured to initiate and adjust wire feeding to the welding operation. The welding torch 16 includes a wire drive assembly 110, which includes a drive motor 112 and the drive rollers 54. The wire drive assembly 110 is configured to drive the welding wire towards the welding operation. For example, the wire drive assembly 110 may pull the welding wire being pushed from the feed motor 46 and deliver the wire to a welding neck. In practice, one of the drive rollers 48 is mechanically coupled to the drive motor 112 and is rotated by the motor to drive the welding wire to the welding operation. Another drive roller (e.g., mating roller) is biased towards the wire to maintain good contact between the drive rollers 48 and the welding wire.

The welding torch 16 also includes the trigger switch 56. The trigger switch 56 is disposed towards the rear end 74 of the torch handle 70 and is radially inward of the trigger 82. Additionally, the trigger switch 56 is positioned such that when the trigger 82 is depressed, the trigger switch 56 is actuated. To this end, the trigger 82 includes a contact portion 114. In a default position, the contact portion is distanced from the trigger switch 56. However, then the trigger 82 is depressed, the contact portion 114 may contact the switch 56, resulting in the aforementioned response when the switch is actuated. As discussed previously, the trigger switch 56 provides a signal that is fed back to the wire feeder 12 to enable the welding process to be started, stopped, and adjusted by the operator.

The welding torch 16 also includes a rotary potentiometer 116 for adjusting the wire speed of the welding operation. The rotary potentiometer 116 is disposed longitudinally between the trigger switch 56 and the adjustment wheel 84. Various types of potentiometers may be employed. For example, the potentiometer 116 may be a variable resistor assembly whose effective resistance is varied by rotating the adjustment wheel 84. As will be appreciated by those skilled in the art, when a voltage input is applied to the potentiometer 116, such as from the wire feeder, varying the effective resistance of potentiometer allows for outputting a voltage that governs the speed of rotation of a drive motor in the wire feeder, the drive motor in the torch, or both.

Figure 4:
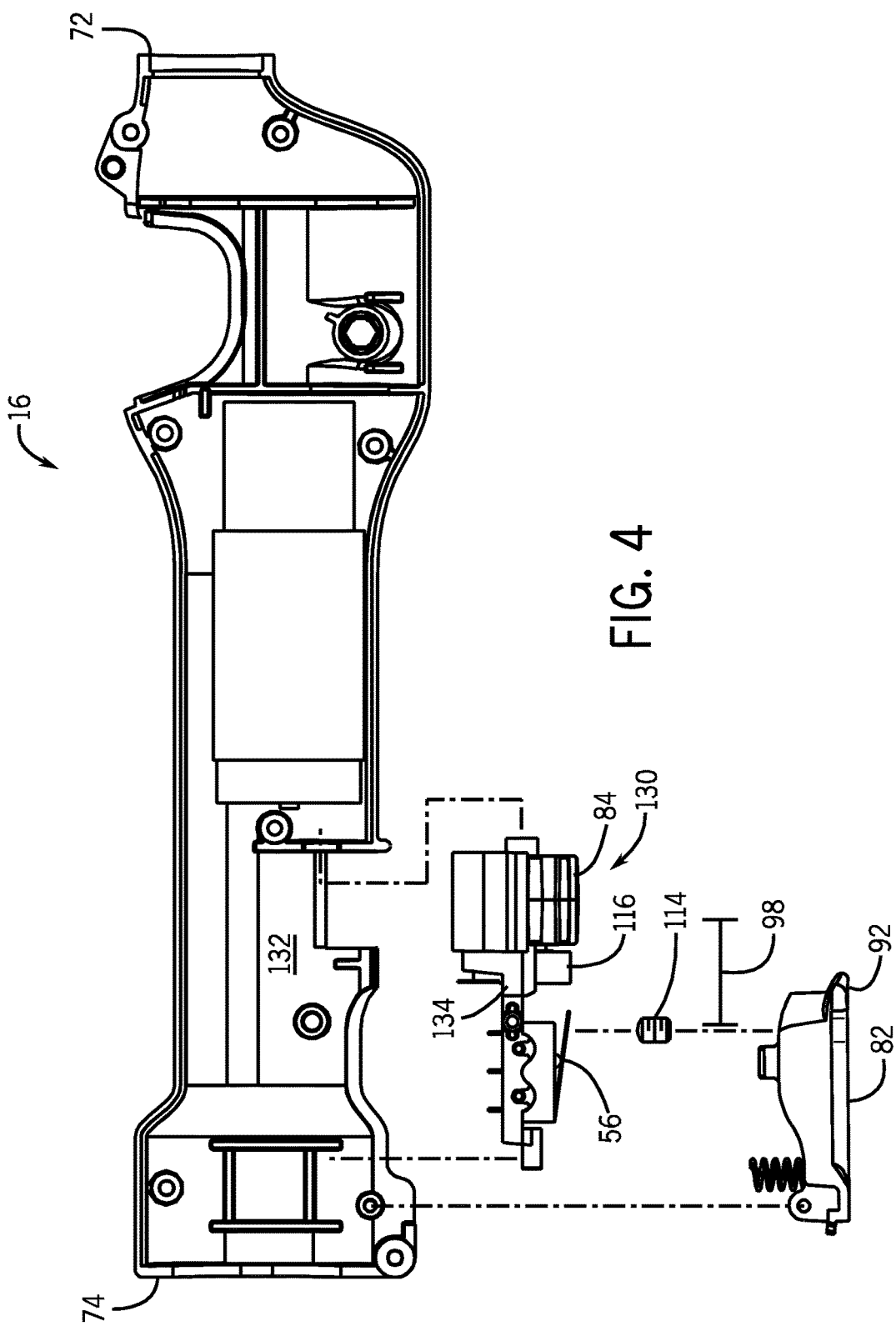
FIG. 4 is a perspective view of a subassembly of the welding torch of FIG. 3 including certain internal components of the welding torch.

In certain embodiments, the trigger switch 56 and the rotary potentiometer 116 may advantageously be part of a single subassembly 130, as shown in FIG. 4. The subassembly 130 may be designed for ease of installation or removal from the welding torch 16. For example, the subassembly 130 may fit into a cavity 132 of the welding torch 16. Accordingly, the subassembly 130 helps with packaging of the rotary potentiometer 116 and other internal components to create a compact welding torch 16 design that is simple to assemble and to subsequently service should replacement of these components be needed. As illustrated, in FIG. 4, the trigger switch 56 is coupled to the rotary potentiometer 116 with a support 134. The support 134 may hold the switch 56 in place and prevent relative displacement of the switch 56, rotary potentiometer 116, or adjustment wheel 84.

As discussed previously, the distance 98 between the trigger 82 and the adjustment wheel 84 may vary in various embodiments of the subassembly 130. Further, the trigger 82 and wheel 84 are designed to be operated with a single hand. Thus, the various subassemblies 130 may be readily removed and replaced with a different subassembly 130 to accommodate the various hand sizes of the operators. For example, a first operator may use the welding torch 16 with a subassembly 130 designed to accommodate the first operator's hand. A second operator may use the same welding torch 16 with a different subassembly 130 that is designed to accommodate the second operator's hand. Thus, the subassembly 130 improves operability of the welding torch 16, while simultaneously reducing the likelihood of inadvertent adjustment of welding parameters. In addition, the welding torch 16 may include additional features to further reduce the likelihood of inadvertent adjustment of the wire feed speed, as described further below in FIGS. 5-8.

FIG. 5 illustrates the welding torch 16 with the trigger 82 (e.g., sliding trigger 140) configured to slide along the longitudinal axis 80 and reduce the likelihood of inadvertent adjustment of welding parameters. As noted above, the sliding trigger 82 and the adjustment wheel 84 are disposed on the bottom side 78 and near the rear end 74 of the torch handle. Additionally, the sliding trigger 82 and adjustment wheel 84 are designed for singled-handed use. The trigger 82 is disposed at an axial position 142 that exposes a portion 144 of the adjustment wheel 84. In certain embodiments, the adjustment wheel 84 may be entirely concealed when the trigger is at the axial position 142, depending on space constraints or other considerations. When the trigger 82 is positioned at the axial position 142, the adjustment wheel 84 may be relatively shielded from obstacles, thereby reducing the likelihood of inadvertent rotation of the adjustment wheel 82.

The sliding trigger 82 may be spring-loaded and have a hook 146 disposed at the rear end 90 of the trigger 82. The hook 146 may be configured to adjust the axial position of the trigger 82. For example, the operator may grasp the hook 146 with a finger to slide the trigger 82 along the longitudinal axis to an axial position 148. The axial position 148 is located between the axial position 142 and the rear end 74 of the torch handle. When the trigger 82 is positioned at the axial position 148, a larger portion 150 of the adjustment wheel 84 may be exposed, as illustrated by FIG. 6. The larger portion 150 may enable the operator to rotate the adjustment wheel 84 using a finger to adjust the wire feed speed.

The sliding trigger 82 and adjustment wheel 84 are designed for singled-handed use. For example, the operator may grasp the hook 146 with a middle finger of a right hand to expose the larger portion 150 of the adjustment wheel 84, and rotate the adjustment wheel 84 with an index finger of the right hand. When the operator removes the finger from the hook 146, the spring-loaded action may return the sliding trigger 82 to the axial position 142. Additionally, the sliding trigger 82 may be designed such that the trigger switch 56 may be actuated only when the sliding trigger 82 is at the axial position 142. For example, the welding operation may be stopped when the trigger 82 is slid back and the adjustment wheel 84 is being rotated. When the sliding trigger 82 is at the axial position 142, such as during the welding operation, the adjustment wheel 84 may be relatively protected from inadvertent rotation. In other embodiments, as described further in FIG. 7, it may be desirable to completely conceal the adjustment wheel 84 during the welding operation.

FIG. 7 is a partial perspective view of the welding torch 16 including the trigger 82 that may completely conceal the adjustment wheel 84 during operation to reduce the likelihood of inadvertent adjustment of the wire feed speed. Again, the trigger 82 and the adjustment wheel are disposed on the same side (e.g., bottom side 78) and near the same end (e.g., rear end 74) of the torch handle 70. As illustrated in FIG. 8, the trigger 82 includes a snap feature 160 to hold the trigger 82 in position. To adjust the wire feed speed, the operator may pull down on the front end 92 of the trigger 82, thereby causing the trigger 82 to open about the rear pivot axis 88 and exposing the adjustment wheel 84. The trigger 82 and the adjustment wheel 84 are positioned for singled-handed initiation and adjustment of the wire feed. For example, the operator may pull down on the snap feature 160 with a middle finger and thumb a left hand, and rotate the adjustment wheel 84 with an index finger of the left hand. Thus, the positioning of the trigger 82 and adjustment wheel 84 may improve operability of the welding torch 84, while simultaneously reducing the likelihood of inadvertent adjustment of welding parameters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch comprising:
   a torch handle;
   a wire drive assembly disposed in the torch handle and comprising a drive motor and a drive roller that contacts a welding wire and configured to drive the welding wire from a wire feeder to a welding operation;
   a trigger disposed near a rear end of the handle and configured to be depressed by an operator for initiating feed of the welding wire; and
   a wire feed speed adjustment assembly positioned near the rear end of the handle adjacent to the trigger and on a same side of the handle as the trigger for allowing operator adjustment of a feed speed of the welding wire.

2. The welding torch of claim 1, wherein the trigger is disposed on a bottom side of the handle and configured to be depressed by one or more fingers of the operator.

3. The welding torch of claim 2, wherein the trigger is pivoted about a rear pivot axis.

4. The welding torch of claim 1, wherein the wire feed adjustment assembly comprises an adjustment wheel mounted to rotate about an axis generally parallel to the torch handle.

5. The welding torch of claim 4, wherein the adjustment wheel is generally centered laterally on a bottom side of the torch handle.

6. The welding torch of claim 4, wherein the adjustment wheel is mounted forward of the trigger.

7. The welding torch of claim 4, wherein the adjustment wheel is recessed within the torch handle.

8. The welding torch of claim 1, wherein the trigger and the wire feed adjustment assembly are positioned to permit one-handed initiation of welding wire feed and adjustment of wire feed speed.

9. The welding torch of claim 1, comprising a switch actuated by depression of the trigger and a rotary potentiometer for adjustment of the welding wire feed speed.

10. The welding torch of claim 9, wherein the switch and the rotary potentiometer are part of a single subassembly disposed within the torch handle.

11. A welding torch comprising:
    a torch handle;
    a wire drive assembly disposed in the torch handle and comprising a drive motor and a drive roller that contacts a welding wire and configured to drive the welding wire from a wire feeder to a welding operation;
    a trigger configured to be depressed by an operator for initiating feed of the welding wire; and
    a wire feed speed adjustment assembly positioned adjacent to the trigger and on a same side of the handle as the trigger for allowing operator adjustment of a feed speed of the welding wire with a single hand.

12. The welding torch of claim 11, wherein the trigger and the wire feed speed adjustment assembly are disposed on a side of the torch handle contacted by the one or more fingers of the operator during a welding operation.

13. The welding torch of claim 12, wherein the trigger and the wire feed speed adjustment assembly are disposed near a rear end of the handle.

14. The welding torch of claim 11, wherein the wire feed speed adjustment assembly comprises an adjustment wheel mounted forward of the trigger.

15. The welding torch of claim 14, wherein the adjustment wheel is recessed within the torch handle.

16. A welding torch comprising:
    a torch handle;
    a trigger disposed near a rear end of the handle and configured to be depressed by an operator for initiating feed of a welding wire through the welding torch; and
    a wire feed speed adjustment assembly positioned near the rear end of the handle adjacent to the trigger and on a same side of the handle as the trigger for allowing operator adjustment of a feed speed of the welding wire.

17. The welding torch of claim 16, wherein the trigger and the wire feed adjustment assembly are positioned to permit one-handed initiation of welding wire feed and adjustment of wire feed speed.

18. The welding torch of claim 17, comprising a switch actuated by depression of the trigger and a rotary potentiometer for adjustment of the welding wire feed speed.

* * * * *